United States Patent [19]

Kaufman et al.

[11] 3,857,462
[45] Dec. 31, 1974

[54] LUBRICATION FOR HEAVY DUTY THRUST BEARINGS

[75] Inventors: Howard N. Kaufman; Albert A. Raimondi, both of Monroeville, Pa.

[73] Assignee: Westinghouse Electric Corporation, Pittsburgh, Pa.

[22] Filed: May 24, 1973

[21] Appl. No.: 363,772

[52] U.S. Cl. ............... 184/11 A, 308/85 B, 308/86, 308/127
[51] Int. Cl. ............................................. F16n 7/16
[58] Field of Search..... 184/6.12, 11 R, 11 A, 13 R, 184/13 A; 74/467, 468; 308/85 R, 85 A, 85 B, 86, 126, 127

[56] References Cited
UNITED STATES PATENTS

| | | | |
|---|---|---|---|
| 1,179,846 | 4/1916 | Lassmann | 308/85 B |
| 1,743,093 | 1/1930 | Alben | 308/86 |
| 2,240,111 | 4/1941 | Cox | 308/85 B |
| 3,635,311 | 1/1972 | Kaufman | 308/127 |

FOREIGN PATENTS OR APPLICATIONS

| | | | |
|---|---|---|---|
| 459,871 | 1/1937 | Great Britain | 308/86 |

*Primary Examiner*—Manuel A. Antonakas
*Assistant Examiner*—S. J. Richter
*Attorney, Agent, or Firm*—C. F. Renz

[57] ABSTRACT

This invention relates to an improved self-lubricating sleeve and thrust bearing configuration, wherein lubrication of the thrust bearing surface may be augmented by an additional supply of oil. The sleeve bearing includes a circumferential oil receiving slot disposed in the upper half thereof and a plurality of axial oil feeding grooves which extend generally downward in a radial direction and in communication between the circumferential oil receiving slot and the thrust bearing surface. A portion of the oil supply that is distributed to the sleeve bearing lubrication port arrangement to initially lubricate the sleeve bearing surface and subsequently the thrust bearing surface by axial leakage along the journaled shaft is diverted to the circumferential oil receiving slot, from which the oil may be conveyed downwardly through passages to each of the axial oil feeding grooves by means of gravity to directly supply the thrust bearing surface with an additional source of lubrication and thereby avoid starvation of the thrust surface while providing a lower thrust bearing operating temperature.

2 Claims, 2 Drawing Figures

LUBRICATION FOR HEAVY DUTY THRUST BEARINGS

CROSS REFERENCES TO RELATED APPLICATIONS AND PATENTS

So far as known, this application is not related to any pending patent application but is an improvement over that disclosed in U.S. Pat. Nos. 3,635,311 and 3,476,452.

BACKGROUND OF THE INVENTION AND PRIOR ART

Self-lubricating journal bearings such as those employed in large heavy duty fans and having a means for distributing oil to lubricate the thrust bearing or sleeve bearing surfaces are well known. One such oil distribution means includes a centrifugal oil-pumping drum of the type having an oil scoop duct and trough for circulating the lubricating oil from an oil reservoir to the bearing surfaces, and reference may be made to the following U.S. Pat. Nos. which illustrate such an arrangement:

| 3,476,452 | Hagg et al. | November, 1969 |
| 3,635,311 | Kaufman | January, 1972 |
| 3,635,312 | Kaufman | January, 1972 |

However, many of the stationary thrust bearing surfaces of the prior art self-lubricating bearings are usually lubricated by a primary supply of reservoir oil which initially flows through oil passages formed in the sleeve bearing to be subsequently conveyed to the thrust surface by means of axial leakage along the shaft. Consequently, the oil reaching the thrust surface is heated by friction and can become hotter than the reservoir oil which feeds the centrifugal pumping drum. Also, the thrust surfaces of the conventional heavy duty fan bearings are known, under certain conditions, to be devoid of lubricant.

An alternate arrangement for lubricating the thrust surface of a stationary thrust bearing may be found in: U.S. Pat. No. 3,494,679 to Burdette granted February, 1970. A primary source of oil is supplied under pressure through passages cut in the thrust bearing to lubricate the thrust surface. Lacking this source of lubricant, the thrust bearing could not operate without loss of efficiency or eventual damage to the bearing assembly.

It would therefore be more desirable and is an object of the instant invention to modify the conventional self-lubricating journal bearing configuration as used in heavy duty fans whereby the thrust bearing surface can also be lubricated by an auxiliary lubrication system and without the need of additional parts. It would also be desirable that the auxiliary supply of lubrication should be able to augment that oil which is supplied to the thrust surface by conventional axial leakage to thereby eliminate the possibility that the thrust surface, after continued operation, may become devoid of lubricant. In addition, it is another object that the augmented lubricant be delivered from an oil reservoir directly to the thrust surface in such a manner that the lubricant will be relatively cooler and result in a lower thrust bearing operating temperature than that which could be achieved by lubricating the thrust bearing surface by conventional axial leakage only.

SUMMARY OF THE INVENTION

An improved self-lubricating sleeve and thrust bearing configuration is disclosed of the type which may be used in conjunction with heavy duty fans. The bearing configuration includes a thrust bearing surface and a sleeve bearing surface, the thrust surface being arranged perpendicularly to the sleeve bearing surface when in the assembled relationship. The sleeve bearing is provided with an upper and a lower half. The sleeve bearing surface is lubricated by means of a branching lubrication port arrangement which extends through the sleeve bearing for conveying a primary source of reservoir lubricant to the rotating sleeve bearing surface, and oil which flows through the lubrication port may be subsequently conveyed from the sleeve bearing surface to the thrust bearing surface by axial leakage along the shaft.

In accordance with the instant improvement, a lubricant receiving slot is circumferentially disposed in the upper half of the sleeve bearing. A plurality of oil feeding grooves are cut in the thrust face of the sleeve bearing and extend generally downward in a radial direction with respect to the fan shaft from the circumferential lubricant receiving slot to the thrust bearing surface to provide communication therebetween. Means are included to distribute a supply of reservoir lubricant to the sleeve bearing lubrication port for lubricating the sleeve bearing surface. In the instant invention the lubrication distribution means may comprise a centrifugal oil pumping disc which is capable of circulating oil from a reservoir to the sleeve bearing.

In accordance with the instant invention, a portion of the oil being supplied to the sleeve bearing lubrication port is diverted to the circumferential lubricant receiving slot from which the diverted portion can be fed downwardly through passages to each of the oil feeding grooves and directly to the thrust bearing surface by means of gravity. Thus, the diverted oil portion serves to augment the lubrication initially supplied to the thrust bearing surface through the sleeve bearing lubrication port arrangement and provides a supply of relatively cooler oil to the thrust surface to thereby lower the thrust bearing operating temperature.

DESCRIPTION OF PREFERRED EMBODIMENT

Figure 1:
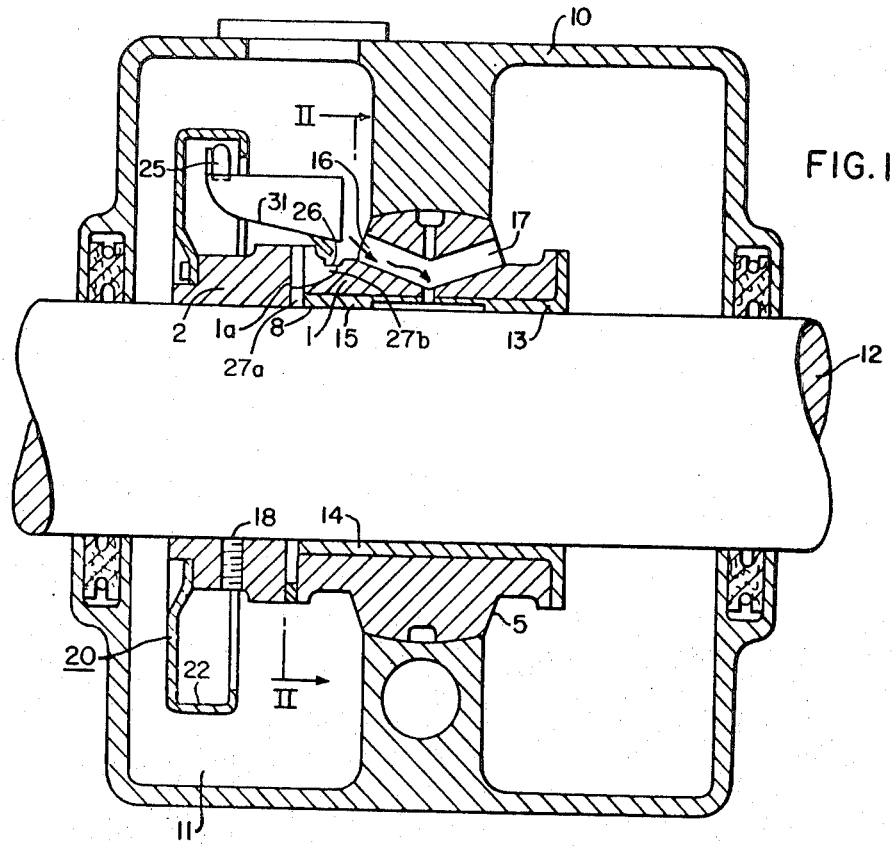
FIG. 1 is a sectional view of the bearing and lubrication arrangement of the present invention.

Referring to FIG. 1 of the drawings, a conventional sleeve and thrust bearing configuration will be described such as that which may be used in conjunction with heavy duty fans. Reference may also be made to U.S. Pat. Nos. 3,635,311 and 3,476,452 for a similar understanding. The bearing configuration includes a sleeve bearing 1 also having a thrust bearing surface 1a, a thrust runner 2 having a thrust surface 8, and a casing 10 having a sump 11 in which a quantity of oil lubricant is maintained at all times during operating of the bearing. The sleeve bearing 1 consists of an upper and a lower half 3 and 5. The thrust runner 2, which may comprise a hub, is attached to a rotatable shaft 12 for rotation therewith by any suitable securing means, such as by fastener 18. Shaft 12 is journalled on sleeve bearing surfaces 13–15, and oil is continuously pumped to be distributed through suitable bearing lubrication ports 16 and 17. Thrust bearing surfaces 1a and 8 are perpendicular to bearing surfaces 13 and 15 in the assembled relationship. Oil passing through the lubrication ports 16 and 17 is distributed to the sleeve bearing surfaces 13-15 and consequently to the thrust bearing surfaces 1a and 8 by means of axial leakage along the shaft.

In order to continuously pump a supply of oil from sump 11 as the shaft 12 rotates for distribution to the bearing lubrication ports, such as at 16, a lubricant distribution means is included. In the preferred embodiment, the lubricant distribution means is a rotatable oil pumping drum 20, which is secured by thrust runner 2 to the shaft 12 for rotation therewith. As the troughed pumping drum is rotated, oil within the sump 11 is picked up by the internal floor surface 22 of the pumping drum and is carried therewith by centrifugal force and the natural tendency of the oil to cling to a surface as the pumping drum 20 rotates to bring the internal trough floor surface 22 from a lower to an upper position. Assuming the shaft 12 to be rotating at sufficient speed, with the pumping drum 20 rotating therewith, a requisite quantity of oil will be picked up from the sump and carried by floor surface 22 to an upper position where it may be scooped off by a scoop means 25 to be deposited on an inclined oil distributing member 31 to thereby be conveyed with a minimum of agitation and consequent aeration of the oil towards lubrication port 16.

Figure 2:
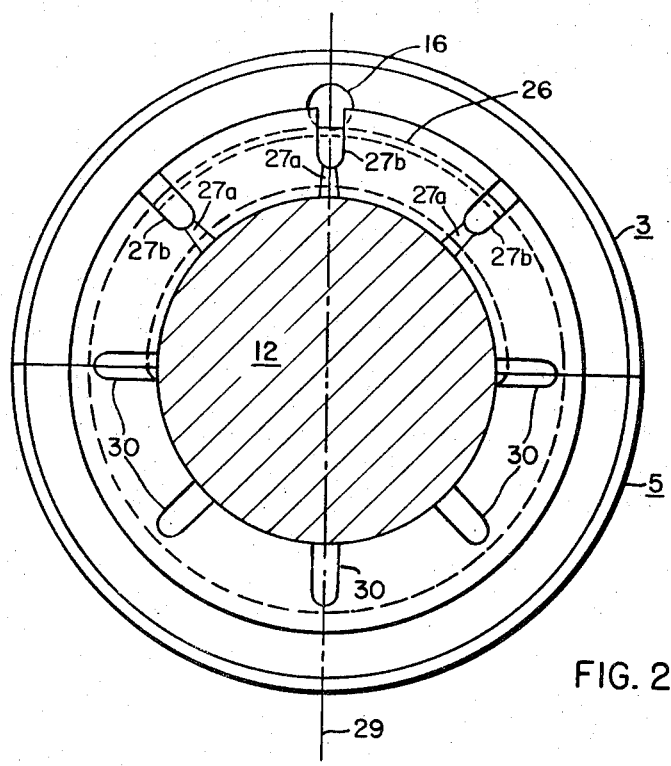
FIG. 2 is a section taken along lines II—II of FIG. 1.

In accordance with the instant invention and referring to both FIGS. 1 and 2, a lubricant receiving slot 26 is circumferentially arranged in the upper half 3 of sleeve bearing 1. A plurality of oil feeding grooves 27a are formed in the thrust face 1a of sleeve bearing 1 and extend generally downward and in a radial direction with respect to shaft 12, as shown, to provide a means of communication from the circumferential lubricant receiving slot 26 to the thrust bearing surfaces 1a and 8. In the preferred form of the invention, it has been found that optimal lubrication can be provided when oil receiving slot 26 is circumferentially extended, but not limited to, an arc of 45° in either direction with respect to the vertical line running perpendicular to the axis of shaft 12 and generally represented by line 29, shown most clearly in FIG. 2. However, it is within the scope of this invention to extend oil receiving slot 26 circumferentially within the upper sleeve bearing half 3 so as to form an arc of not more than 90° in either direction with respect to the vertical 29, for a reason that will be readily apparent. The oil feeding grooves 27a that are formed in the thrust face of sleeve bearing 1 communicate through passages 27b with circumferential slot 26 while maintaining uniform spacings therebetween. The number of grooves 27a will depend upon the extent of the arc formed by the circumferential oil slot 26 with respect to the vertical 29. Ideally, the greater the arc (up to the limits already expressed), the larger will be the number of radially extending grooves that will communicate with slot 26 and the thrust surface 8.

In the present arrangement, a portion of the oil being supplied to the sleeve bearing lubrication port 16 over surface 31 by distribution means 20 is diverted to the circumferential lubrication receiving slot 26 from which the diverted portion will bypass port 16 and can be fed downwardly through passages 27b to each of the oil feeding grooves 27a directly to the thrust bearing surfaces 1a and 8 by means of gravity and without the need of a source of pressure. Thus, the arc formed by circumferential slot 26 in the upper half of sleeve bearing 3 must be dimensioned to enable oil to flow to each of the oil feeding grooves 27a under the influence of gravity.

The diverted portion of oil serves to augment lubrication being supplied to the stationary thrust bearing surface 1a through the conventional sleeve bearing lubrication port arrangement and subsequent axial leakage along the shaft or from a plurality of oil distribution apertures 30. Sparse lubrication of the thrust bearing surface can therefore be prevented by the additional supply of oil. Since the diverted portion of oil comes directly from an oil reservoir without passing first through the sleeve bearing lubrication ports where the oil could be undesirably heated due to friction, lubrication to the thrust bearing surface is augmented by a relatively cooler supply of oil which, in addition, can result in lower thrust bearing operating temperatures and less bearing wear. Other modifications will be known to those skilled in the art.

We claim as our invention:

1. A sleeve and thrust bearing configuration to journal a rotating shaft having a sleeve bearing surface and a thrust bearing surface, said thrust surface being arranged perpendicularly with respect to said sleeve bearing surface and said sleeve bearing having an upper and a lower half, a lubrication port extending through said upper sleeve bearing half for communication with said sleeve bearing surface and adapted to convey a supply of lubricant to said sleeve bearing surface and subsequently to said thrust bearing surface, a lubricant receiving slot circumferentially disposed in said upper half of said sleeve bearing, at least one lubricant feeding groove disposed in the thrust face of the upper half of said sleeve bearing, means to distribute a supply of lubricant to said sleeve bearing lubrication port and to said lubrication receiving slot, and passage means adapted to divert a portion of said lubricant supply from said circumferential lubricant receiving slot to said lubricant feeding groove, whereby the diverted lubricant portion can be fed downwardly through said at least one lubricant feeding groove and directly to said thrust bearing surface by means of gravity to thereby augment the lubrication of said thrust surface.

2. The invention of claim 1, wherein said circumferential lubricant receiving slot forms an arc of not more than 90° on either side of the vertical, said vertical comprising the line running perpendicular to the axis of rotation of said shaft and parallel to said thrust surface.

* * * * *